UNITED STATES PATENT OFFICE.

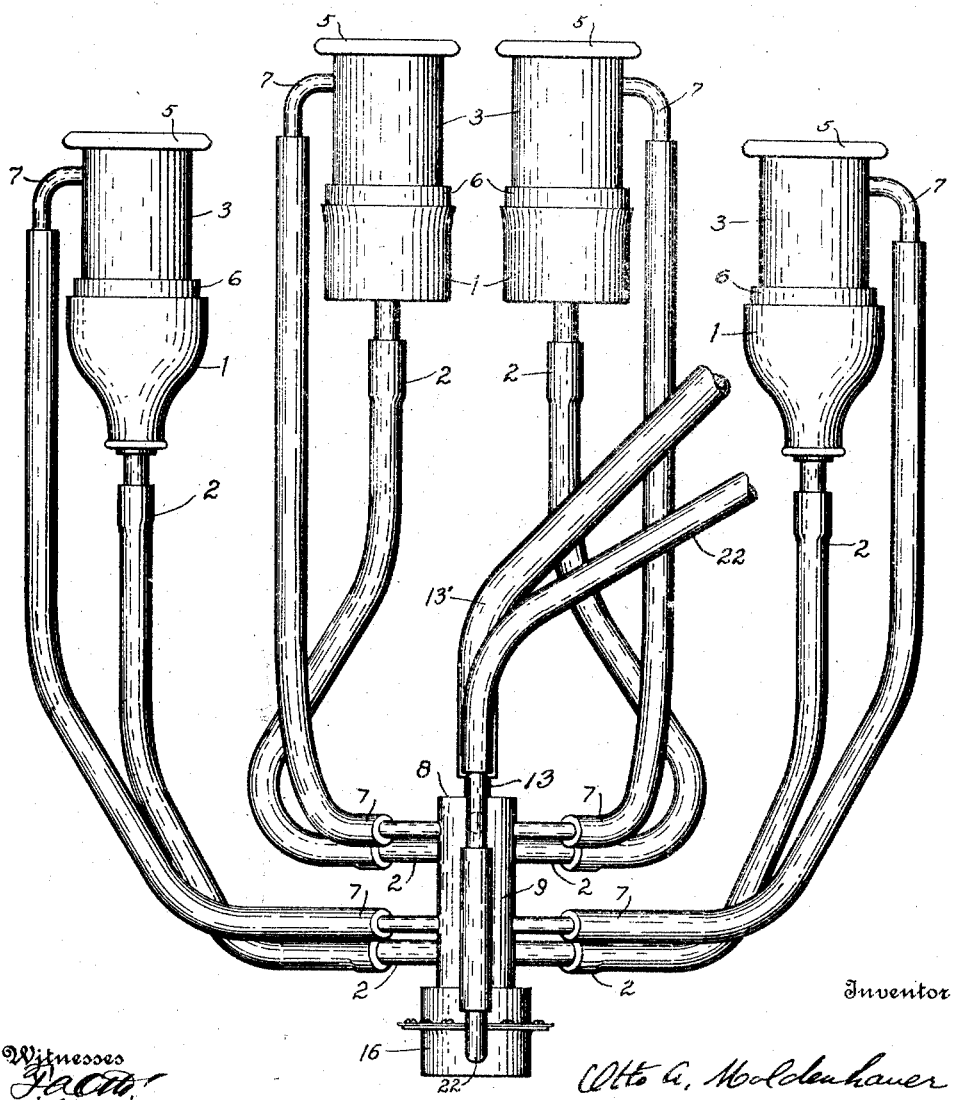

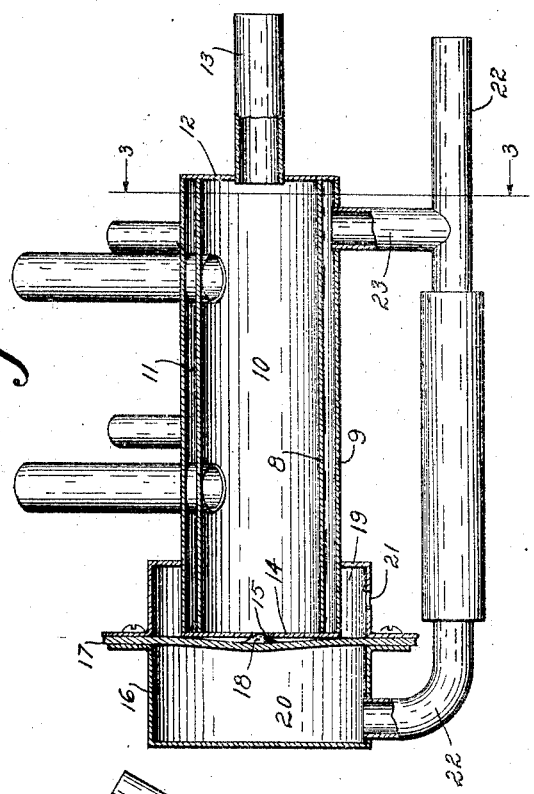
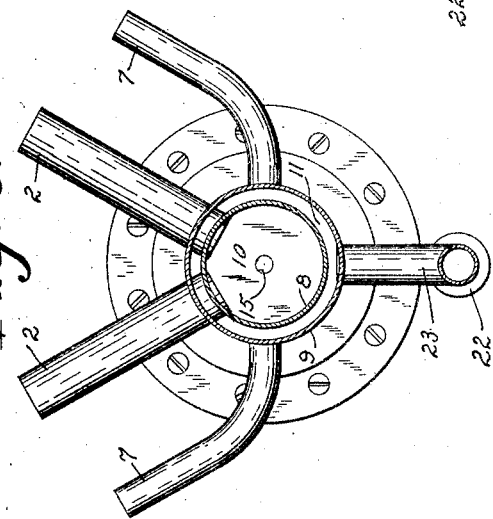
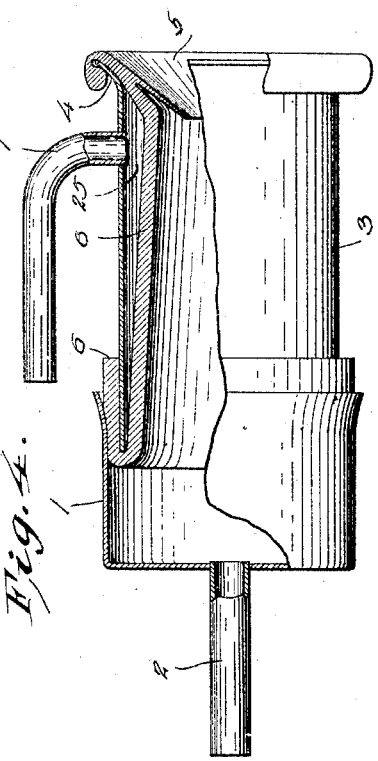

OTTO A. MOLDENHAUER, OF WATERTOWN, WISCONSIN.

MILKING-MACHINE.

1,366,205.     Specification of Letters Patent.     Patented Jan. 18, 1921.

Application filed November 6, 1916. Serial No. 129,685.

*To all whom it may concern:*

Be it known that I, OTTO A. MOLDENHAUER, citizen of the United States, residing at Watertown, county of Jefferson, and State of Wisconsin, have invented new and useful Improvements in Milking-Machines, of which the following is a specification.

My invention relates to improvements in milking machines. The ordinary milking machine operates by intermittingly creating and relieving a vacuum in the teat cup whereby the milk is drawn from the udder. A machine so operated, requires a high degree of vacuum in the milk conveying system and a correspondingly hard pull on the cow's teats. I propose to use double walled teat cups with the inner wall composed of flexible material, and reduce the pressure alternately in the interior of the cup and in the annular space or cavity between the walls. I am thus enabled to use a much lower degree of suction than is necessary in the ordinary type of machine, for atmospheric pressure in the concentric chamber of the teat cup will squeeze the teat when suction is applied to the cup's interior, and where this is followed not only by relaxation due to the admission of air to the cup, but by a positive withdrawal of the walls of the cup from the teat, I am able to secure not only a sequence of suction and relaxation, but a combination of suction and externally applied pressure, followed by relaxation and a positive withdrawal of the pressure applying means from the teat.

My principal object, however, is to provide means whereby the teat may be first subjected to a gradually increasing pressure, then subjected to both suction and pressure, then to a relatively light suction without pressure and then relieved of both suction and pressure, all in a continuous cycle of operations, performed in such a manner that the heaviest pressure and the initial pressure will be applied to the teat near the top of the cup and will be extended downwardly with uniformly diminishing pressure toward the lower end of the teat, followed by a progressive relief in pressure commencing near the top of the cup and extending downwardly until substantially all pressure has been relieved and a partial vacuum formed within the teat receiving portion of the cup.

Somewhat differently stated, it is the object of my invention to provide improved means for varying the pressure in the teat cups and their concentric compartments in such a manner that the milk will be both pressed and sucked from the teats and a minimum of vacuum will be necessary.

In the drawings—

Figure 1 is a general view of a portion of a milking machine embodying my invention.

Fig. 2 is a cross section in a vertical longitudinal plane of my milk collecting chamber and suction operated valve.

Fig. 3 is a sectional view of said chamber drawn to line 3—3 of Fig. 2.

Fig. 4 is an elevation of a teat cup adapted for use with my machine, parts thereof being cut away to expose the interior.

Like parts are identified by the same reference characters throughout the several views.

The four teat cups are each provided with cup shaped base members 1 from which tubes 2 lead to the milk collecting chamber. The upper portion 3 of the teat cup is of smaller diameter than base member 1 and is flanged at its upper end. The flange 4 carries the upper margin of the teat holding, apertured diaphragm or annulus 5 from which the flexible tube 6 depends. The annulus 5 extends inwardly in the form of a relatively thin webbing which projects beyond the circular line where it connects with the tube 6. The upper end of the tube 6 is contracted downwardly for a short distance from the line of its connection with the annulus 5 and is then expanded conically, but less abruptly, until it reaches the lower end of the tube 3, with the inner surface of which, it is in substantial contact at said lower end. It will be observed that the downwardly and inwardly contracted upper end portion of the tube 6 is progressively thickened until it reaches the annular shoulder formed by the junction of the downwardly contracted portion with the downwardly expanding portion of the tube. This annular shoulder in the tube 6 is adapted to receive the neck portion of the teat. Within the circular line of this shoulder, the inner marginal portion of the annulus 5 engages the teat, the extreme inner edge of said annulus preferably extending downwardly far enough so that, when subjected to the pressure of the teat, it will tend to fold downwardly over the annular shoulder on the tube 6 with a tendency, however, to spring resiliently away from said shoulder. Ring 5 is formed integrally with tube 6 and is preferably composed of rubber or other elastic substance. The lower end of this tube is folded around the bottom of member 3 and serves to make a tight joint between members 1 and 3. These members are held together by friction only and they may be pulled apart for the purpose of cleaning or inspecting the inside of the teat cup. When they are thus separated, tube 6 hangs free and every portion of the teat cup is readily accessible. To aid in putting the parts together again, I slightly enlarge the rim of base member 1 so that the resilient tube may be readily wedged between members 1 and 3 to lock said members in operative position. A tube 7 opens through the wall of the upper casing member into the space between this member and the rubber tube 6.

The eight tubes from the four teat cups converge to the collecting chamber 8. This chamber has two concentric cylindrical walls 8 and 9 respectively, forming a cylindrical inner compartment 10 and an annular compartment 11 surrounding it. The end wall 12 is provided with an opening to which pipe or nipple 13 is fitted as a milk outlet. The other end wall 14 is ported at 15 and a valve casing 16 surrounds this end of the collecting chamber. The casing 16 is made in two parts, the meeting ends of which are flanged and bolted together at intervals. Between the flanges a resilient diaphragm 17, preferably made of rubber, is clamped in a plane adjacent to that of the wall 14. A small knob or projection 18 is carried by the diaphragm in a position where it serves as a valve for port 15.

The diaphragm 17 divides the interior of the valve casing into two chambers or cavities 19 and 20 respectively. A port 21 provides communication between the annular cavity 19 and the outer air, but cavity 20 opens only into tube 22 which also communicates through branch tube 23 with annular compartment 11 of the collecting chamber. All of the air tubes 7 lead from the space between the inner and outer walls of the teat cups into annular cavity 11 and the tubes 2 lead from the interior of the teat cups to the interior compartment 10 of the collecting chamber.

In practice tubes 13' and 22 lead to a three way valve to which an air exhauster is connected. A pulsator of ordinary construction (not shown) operates the valve. Pipe 13' also allows the milk collected in compartment 10 to pass into a suitable container or pail. The pulsator, and three way valve may be of ordinary construction and as their structure is well known to those skilled in the art, they are not shown in the drawings.

In operation, assuming the teat cups to be adjusted in position for use, the collecting chamber 8 will preferably be adjusted in a horizontal position as indicated in Fig. 2 and the pipe or duct 13' connected at one end with the nipple 13 and at the other end through the pulsator valve to a milk receiver or pail, normally closed to the exterior atmosphere. Air will then be simultaneously withdrawn from the pipe 13' (or 22) and admitted to the other of these pipes in alternation. For example, when air is withdrawn from pipe 13' a vacuum will be created in this pipe which will extend to chamber 10 and through said chamber to the interior of the teat cups through the pipes or ducts 2. The simultaneous admission of air to duct 22 provides atmospheric pressure in cavity 20 and the diaphragm chamber 16, thereby causing the diaphragm 17 to move inwardly, valve projection 18 entering and closing the port 15. The air also passes through branch duct 23 into the annular cavity 11 of the collecting chamber and from this cavity through the pipes or ducts 7 to the annular cavities 25 between the inner and outer walls of the respective teat cups. The flexible wall 6 of each teat cup will therefore move inwardly by reason of the reduced pressure within the cup and the existence of full atmospheric pressure upon its exterior surface. This inward movement of the wall 6 will occur almost immediately after suction is established within the cup by reason of the withdrawal of air from pipe 13'.

After a brief interval of suction within the teat cup, air is withdrawn through pipe 22 and pipe 13' is simultaneously opened to the atmosphere. The suction exerted through pipe 22 will thereupon extend through this pipe to cavity 20 of the diaphragm chamber 16. Thereupon air is permitted to enter the collecting chamber 10 through ports 21 and 15, valve 18 being opened as soon as the pressure underneath diaphragm 17 is reduced below that of its upper surface. The upper surface of the diaphragm is exposed to atmospheric pressure, except at the center, where an area equal to that of port 15 is exposed to whatever pressure may be exerted in collecting chamber cavity 10.

Simultaneously with the withdrawal of air from the diaphragm chamber 20, air is also withdrawn from the annular cavity 11 of the collecting chamber and through the ducts 7 from the annular cavities 25 between the interior and exterior walls of the teat cups. Therefore as soon as air enters port 15 of the collecting chamber, milk is permitted to flow out of said chamber to the receiver or pail through the ducts 13, 13' by gravity, the air thereupon passing to the interior of the teat cups through the ducts 2. There will then be an excess of pressure upon the inner surface of the flexible wall 6 of each teat cup above that upon its outer surface and this causes a positive retraction of the teat cup walls from the teats, the suction upon the teats being simultaneously relieved.

As soon as both suction and pressure upon the teats has been fully relieved, air will again be admitted to duct 22 and withdrawn from duct 13', thereupon closing valve 18, pressing the walls 6 of the teat cups inwardly and simultaneously applying suction to the teats. It is desirable to apply suction through pipe 13' for a slightly longer period than that of the suction through pipe 22, for the reason that, when the suction is applied through pipe 22, it extends almost immediately to the annular teat cup cavities 25, whereas, when suction is applied through the pipe 13, 13', a short interval is required to draw the milk from the cups and passages to the collecting chamber, sufficiently to admit air to the system through port 15 to the teat cups. Therefore the wall 6 of each teat cup is gradually withdrawn from the teat as the vacuum in the annular chamber 25 is built up in excess of the vacuum which still exists within the teat cup. This allows the milk within the teat to be drawn out by suction alone during the brief interval between the withdrawal of the wall 6 from the teat and the entry of air to the interior of the cup in sufficient quantity to reëstablish atmospheric pressure therein. I attach considerable importance to this feature, for I have discovered that where pressure is applied annularly to expel the milk from a teat, there is a tendency, when such pressure is relaxed, for the milk to flow downwardly into the expanding teat from the udder and a very light suction at this instant is sufficient to cause a considerable discharge of milk in addition to that previously discharged while pressure was being applied.

Similarly, when suction is again applied through the duct 13, 13', a little time is required for closing the valve 18, since the pressure must first build up in diaphragm chamber 20, therefore pressure exerted upon the flexible walls 6 of the teat cups will develop a little in advance of the full suction pull through the interior of the cup. This tends to prevent injury to the interior tissues of the teat during the period of maximum suction, such as sometimes results where the teat is permitted to dilate under a suction pull exerted on all sides thereof. By employing a diaphragm chamber to control the admission of air to the compartment or cavity 10 and by connecting the same duct, through which air is exhausted from the diaphragm chamber, to the annular cavity 11 in the collecting chamber, I am enabled to automatically secure the sequence of operations above described, whereby intermediate periods of partial vacuum in both of the teat cup cavities are secured and whereby pressure is applied to the teats in advance of maximum suction. The object of the annular cavity 11 is to provide a convenient means for connecting the ducts 7 with the common air withdrawal duct 23, 22.

When air is admitted to the annular cavity 25, it enters the cavity near the upper end of the tube 6. This fact, together with the fact that the wall of the tube 6 is relatively thin near its junction with the annulus 5, and the further fact that this portion of the cavity is of larger diameter than the lower portion, all tend to cause the wall of the tube 6 to move into pressure contact with the teat substantially along the line of the annular shoulder near the upper end of the tube 6, and this pressure upon the teat is then developed progressively and with diminishing force downwardly toward the lower end of the teat. The extreme tip of the teat will, at all times, be left without pressure, and therefore there is no tendency for the pressure of the tube to close the outlet of the teat. On the contrary, the suction which is then applied to the interior of the cup tends to cause an expansion of the outlet of the teat, whereby milk delivery, with minimum force developed by either pressure or suction, is accomplished.

When the vacuum is relieved within the teat receiving portion of the cup and developed in the cavity 25, the upper end portion of the tube 6 will be first to respond to the outward suction pull, owing to the tendency of the tube to resume its normal position as shown in Fig. 4, and also to the fact that the upper end of the tube is somewhat thinner, and to the fact that the vacuum is first produced in the upper portion and the inwardly contracted shoulder is subjected to both upward and downward tension of the rubber composing the tube, the tendency being to draw the wall of the tube toward a straight line or cylinder following the wall of the outer tube 3. Therefore the upper portion of the teat will begin to fill with milk from the udder even before the pressure and flow of milk from the lower portion of the teat has ceased.

I claim—

1. In a milking machine, a teat cup including the combination of a cylindrical casing member, a flexible lining wall therein, spaced therefrom at progressively increasing distances from each end to an annular contracted zone near the upper end, an integral inwardly projecting elastic annular teat engaging flange diverging from the upper portion of the lining member inwardly and downwardly over said contracted zone in the lining member, the ends of the lining member being secured to the casing member.

2. In a milking machine, a teat cup including the combination of a cylindrical casing member, a flexible lining wall therein, spaced therefrom at progressively increasing distances from each end to an annular contracted zone near the upper end, an integral inwardly projecting elastic annular teat engaging flange diverging from the upper portion of the lining member inwardly and downwardly over said contracted zone in the lining member, a cap for closing the lower end of the casing member, and securing the lining member thereto, a suction duct connected with the cap, another suction duct connected with the casing member exterior to said contracted zone, and means for securing the upper end of the lining member to the casing member, comprising an outwardly expanded portion of the casing member, and a folded portion of the lining member provided with a terminal bead adapted to engage upon the exterior surface of the expanded portion of the casing member.

3. In a milking machine, the combination with a set of teat cups of a milk collecting chamber including an inner compartment, milk conveying tubes leading thereto, an outer compartment, a suction duct communicating with the inner compartment and adapted to withdraw the collected milk, another suction duct communicating with the outer compartment, said last named duct including a suction operated valve, adapted, when open, to relieve the vacuum in the inner compartment.

4. In a milking machine, the combination with double walled teat cups of a two compartment collecting chamber, said compartments being concentrically arranged, ducts leading from the interior of the teat cups to one of said compartments, ducts leading from the space between the walls to the other compartment, suction ducts for separately withdrawing air from and subsequently readmitting it to the respective compartments, a valve controlling admission of air to one compartment, and means for opening said valve to relieve the vacuum in that compartment immediately after the suction is applied to the other compartment.

In testimony whereof I affix my signature in the presence of two witnesses.

OTTO A. MOLDENHAUER.

Witnesses:
N. H. FALK,
T. E. PENN.